United States Patent
Herrmann (10) Patent No.: US 6,992,976 B1
(45) Date of Patent: Jan. 31, 2006

(54) NETWORK FOR A RECONFIGURATION AFTER A STEP-BY-STEP REPAIR DEFECTS

(75) Inventor: Christoph Herrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 848 days.

(21) Appl. No.: 09/857,964

(22) PCT Filed: Oct. 10, 2000

(86) PCT No.: PCT/EP00/09998

§ 371 (c)(1),
(2), (4) Date: Jun. 12, 2001

(87) PCT Pub. No.: WO01/28163

PCT Pub. Date: Apr. 19, 2001

(30) Foreign Application Priority Data

Oct. 14, 1999 (DE) ............................... 199 49 642

(51) Int. Cl.
*H04L 12/26* (2006.01)

(52) U.S. Cl. ......................................... 370/222; 714/2
(58) Field of Classification Search ........ 370/216–228, 370/245, 254, 258; 707/3–5; 714/2, 7, 48–49
See application file for complete search history.

(56) References Cited

U.S. PATENT DOCUMENTS

| | | | | |
|---|---|---|---|---|
| 4,596,982 A | * | 6/1986 | Bahr et al. .................... | 370/223 |
| 5,469,428 A | * | 11/1995 | Tokura et al. ............... | 370/224 |
| 5,732,086 A | * | 3/1998 | Liang et al. ................. | 370/410 |
| 5,815,490 A | * | 9/1998 | Lu ............................... | 370/223 |
| 6,301,254 B1 | * | 10/2001 | Chan et al. .................. | 370/397 |
| 6,775,228 B1 | * | 8/2004 | Solana De Quesada .... | 370/217 |

FOREIGN PATENT DOCUMENTS

EP 0871344 10/1998

* cited by examiner

*Primary Examiner*—Wellington Chin
*Assistant Examiner*—John Shew
(74) *Attorney, Agent, or Firm*—Larry Liberchuk (57) ABSTRACT

The invention relates to a packet transmission network operating according to a packet switching method, comprising a plurality of network nodes coupled via at least two rings working in opposite directions which each have in status tables entries about the location of a defect and switched loops from one ring to another ring in a network node. After detecting a repaired defect, a network node changes an entry in its status table and transmits a repair message of this type about the location of the repaired defect to all the network nodes that can be reached.

7 Claims, 8 Drawing Sheets

NETWORK FOR A RECONFIGURATION AFTER A STEP-BY-STEP REPAIR DEFECTS

The invention relates to a packet transmission network operating in accordance with a packet switching method, comprising a plurality of network nodes coupled via at least two rings working in opposite directions and contain each in status tables entries about the location of a defect and switched loops from one ring to another in a network node.

Such a network node, which operates according to a packet switching method is known from EP 0 871 344 A2. The asynchronous transfer mode (ATM) is used here as a special packet switching system. This network contains a plurality of ring systems with a plurality of network nodes which are coupled in a ring system via two opposite direction rings. The network nodes have station terminals via which they are coupled to either a station or another network. In the event of a node failure or line rupture, the network node detecting this defect informs a network management system of the location of the line rupture. A network node then detects a node failure or line rupture when it no longer receives packets from a neighboring network node via a line of a ring. In the asynchronous transfer mode packets of fixed length are used, which are referred to as cells. The reconfiguration mechanism controls the configuration of the network in that the detecting network node sends loop messages, which uniquely identify the defective transmission line and the ring node involved to all the network nodes over the two rings. All the network nodes reached by the loop messages enter in their respective local tables the data identifying the ring node and transmission line involved. After each table entry all the ring nodes evaluate their local tables. The ring node involved, which contains and evaluates these status messages, then switches a loop so that packets are no longer routed to the defective line but to the other ring. The described algorithm is, in addition to detecting simplex cable ruptures (only the cables of the same ring break, the other ring remains intact), also capable of handling the case of a duplex cable rupture, so that in case of a duplex cable rupture still all the nodes can be reached. Furthermore, the case of an isolated node which occurs, for example, when a complete node fails, and the case of an isolated group of nodes can be handled, so that the other nodes (in the case of the isolated node) or the nodes of the isolated group among themselves respectively, and the remaining nodes (in the case of a group of isolated nodes) can still communicate among them.

It is an object of the invention to provide a network in which after defects have been repaired, measures are rendered available to the network to return to a normal status.

The object is achieved by a network of the type defined in the opening paragraph in that a network node, after detecting a repaired defect, is provided for changing an entry in its status table and for transmitting a repair message of a first type about the location of the repaired defect to all the network nodes that can be reached.

The invention is based on the idea that a network node detecting the repair of a line rupture or node defect informs all the network nodes that can be reached of this repair by means of a repair message of a first type, so that these nodes are informed that, for example, a connection to a certain subscriber, can again be established. A network node cannot exactly determine whether it is a matter of a repair of a line rupture or of a defective node. For example, there may be detected only via the synchronization that is possible again, or because special monitoring packets from the neighboring nodes are received again, that the receive line of the detecting node is intact again or the neighboring node is again in a position to send packets respectively. The network node detecting that a defect has been repaired subsequently sends a repair message of a first type, which contains information about a repaired defect on a transmitter line of a neighboring node, to all the other network nodes that can be reached.

A network node receiving the repair message of a first type replaces the respective entry identifying the ruptured line and resulting loop respectively, by an entry that expresses the repair of this line and the termination of the loop respectively (patent claim 20). By evaluating the thus updated status table, the network node detects where the location of the repaired defect is and whether an action is to be performed. Such action may be the termination of a closed loop and the subsequent transmission of a repair message. Such action may also be the renewed transmission of repair messages of a first type previously generated and transmitted by itself.

For enabling a network node to identify the location of a repaired defect, the network node detecting the repair of a defect sends a repair message of a first type, which contains details about the network node that has a transmit line that delivers packets again and details about the ring to which the transmit line that conveys packets again belongs. The network node detecting a repair of a defect then detectes from which receive line it receives packets again.

Patent claim 3 indicates under what conditions a network node terminates a loop in the network node from one ring to another. Claim 4 describes when a network node of an isolated node group or of an isolated node again transmits a repair message of a first type already transmitted once. Claim 5 explains when a repair message is erased.

The invention also relates to a network node in a network operating according to a packet switching method.

Examples of embodiment of the invention will be further explained hereinafter with reference to the drawing Figures in which.

Figure 1:
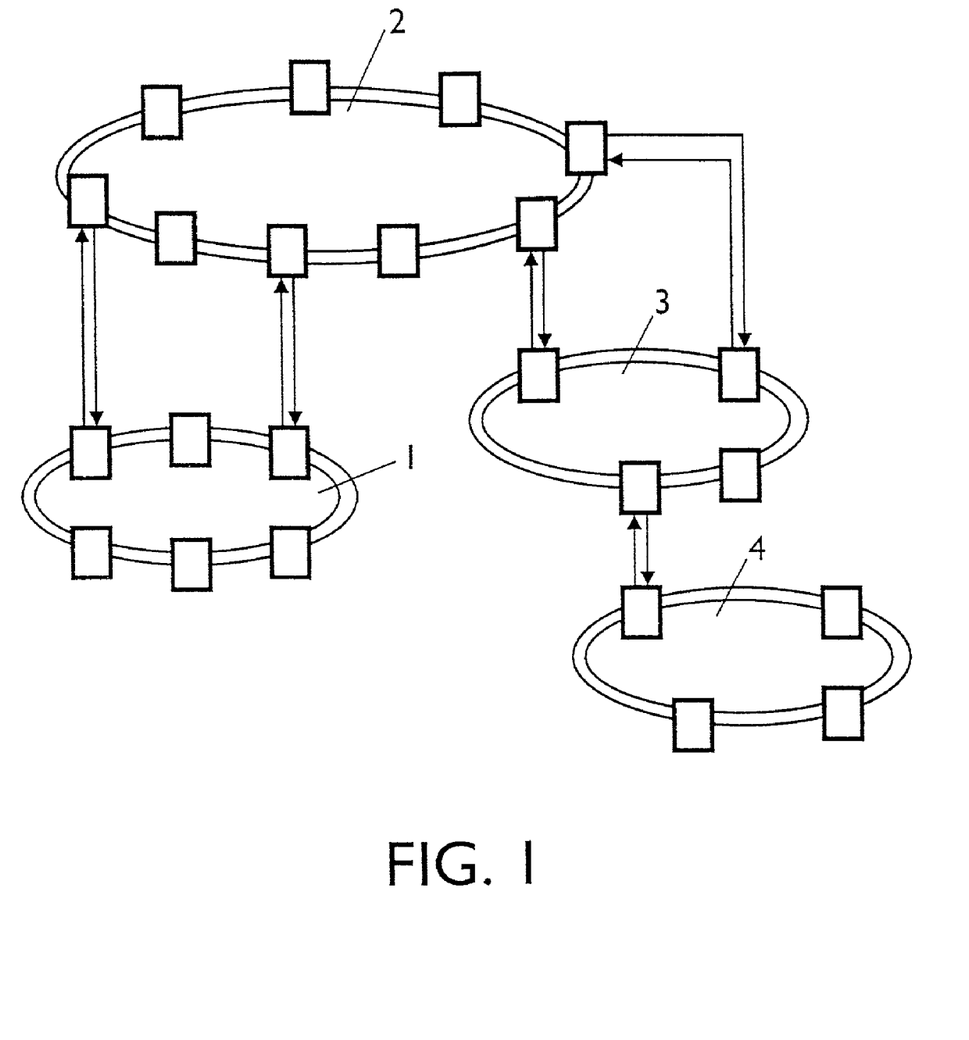
FIG. 1 shows a local area network.

FIG. 1 shows an exemplary embodiment of a local area network comprising four ring systems 1 to 4, which have each two rings. A ring is understood to mean a closed signal path over a plurality of network nodes. The ring systems 1 to 4 are each formed by two rings working in opposite directions, that is to say, the signals run in opposite directions on the rings. A network node shown as a rectangle in the ring systems 1 to 4 comprises a network interface with four ring connections and two station connections.

Either a station or a network interface of another ring system is connected to the station connections. In FIG. 1, for example, for the ring system 2, a total of five network interfaces are connected to stations and four network interfaces are connected to network interfaces of the ring systems 1 and 3. A station may be, for example, a telephone, a videophone, a personal computer or a workstation. The messages or information respectively, originating from the stations or network interfaces respectively are transmitted in cells in the asynchronous transfer mode (ATM). A cell contains a header field of 5 bytes and an information field of 48 bytes. The information contained in the header field of the cell is used more particularly for addressing and carrying out switch functions.

Figure 2:
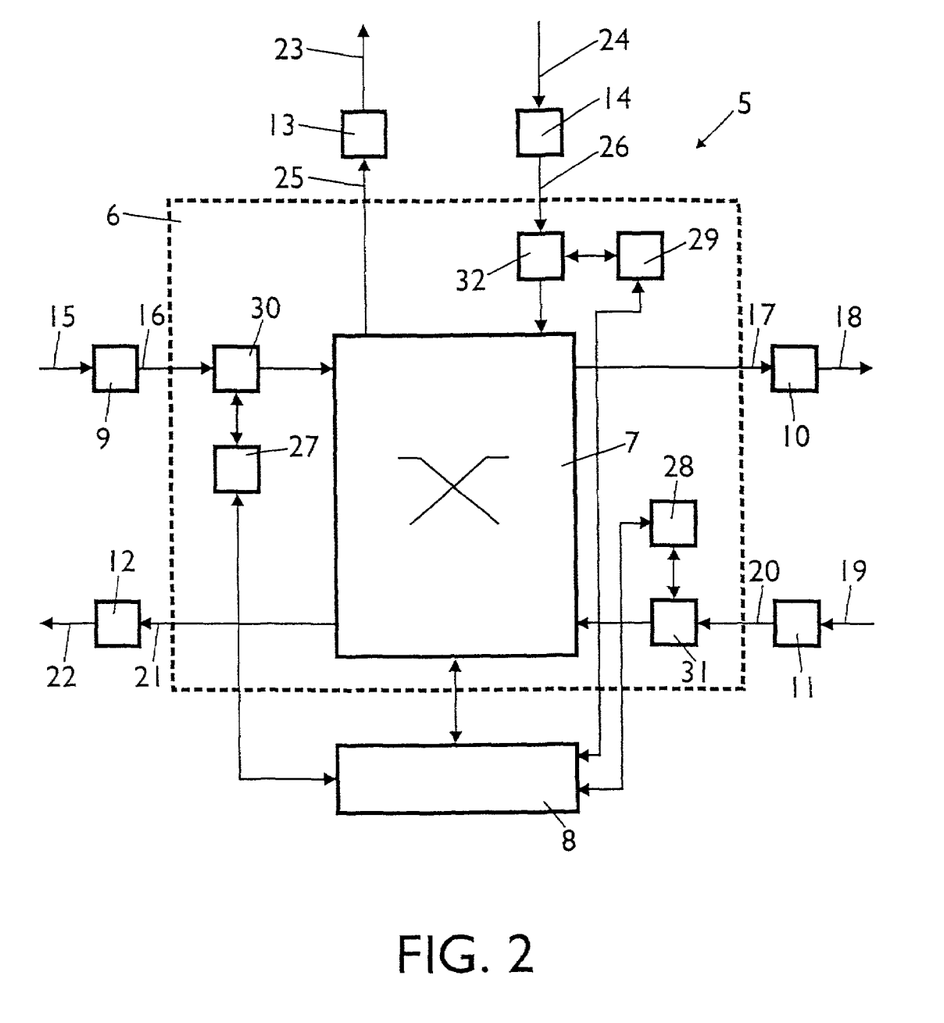
FIG. 2 shows a network interface that can be used in the local area network shown in FIG. 1, and FIGS. 3 to 15 show ring systems of a local area network after the repair of one or various line ruptures.

A network interface 5 having four ring connections is shown in more detail in FIG. 2. The network interface 5 contains a switching device 6 and a control arrangement 8. The switching device 6, which contains a switch 7, is coupled to ring and station connections via alignment circuits 9 to 14 and has the function of switching the cell stream further. The alignment circuits 9 to 14 may comprise, for example, converter arrangements for mapping the cells into higher-order transport frames (for example, into transport frames of the Synchronous Digital Hierarchy (SDH)), or buffer memories for clock alignment when the cells are transferred without being mapped into a higher-order transport frame.

The alignment circuit 9 is coupled, on the one hand, to a receiving ring connection 15 of a first ring and, on the other hand, to a connection 16 leading to the switching device 6. The alignment circuit 10 is coupled to the switching device 6 via a connection 17 and applies a cell stream to a send ring connection 18 of the first ring. A cell stream from a receiving ring connection 19 of a second ring is received by the alignment circuit 11, which applies a cell stream to the switching device 6 via a connection 20. From a connection 21 of the switching device 6, the alignment circuit 12 receives cells which are transferred to a send ring connection 22 of the second ring.

A station connection 23 is coupled to the network interface 5 via the alignment circuit 13 and so is a station connection 24 via the alignment circuit 14. The alignment circuit 13, which receives the cell stream from the switching device 6, is coupled to the switching device 6 via a connection 25. The alignment circuit 14, which is supplied with a cell stream from a network interface of another ring system or a station, is coupled to a station or to a network interface of another ring system via the station connection 24, and to the switching device 6 via a connection 26. If no cell conversion or clock alignment is necessary, the alignment circuits 9 to 14 are not needed.

The control arrangement 8 is provided for controlling the switching device 6 and for further control functions (for example, call set-up and disconnection). The control arrangement 8, which may be arranged as a microprocessor, receives and generates also cells for these functions.

In addition to the switch 7, the switching device 6 includes three path memories 27, 28 and 29 and three receiving circuits 30, 31 and 32. The header fields of cells coming in via connections 16, 20 and 26 are evaluated in the receiving circuits 30, 31 and 32.

Address information contained in the header field is used for addressing various tables for the path memories 27, 28 and 29 connected to the receiving circuits 30, 31 and 32. The data stored in the tables are used by the respective receiving circuits 30, 31 and 32 for organizing the further processing and transport of the cell. For example, the receiving circuit 30 can copy the cell and add new address information thereto. The original cell is switched to the station connection 23, for example, by the switch 7, and the copied cell is switched to the alignment circuit 10. Furthermore, there is the possibility of the switch 7 carrying out this copy function.

The receiving circuit 30 is coupled to the alignment circuit 9 via the connection 16 and transfers received cells to the switch 7. The path memory 27 is connected to the receiving circuit 30. The receiving circuit 31 is connected to the path memory 28, receives cells from the buffer memory 11 and transfers cells to the switch 7. Between the switch 7 and the connection 26 is arranged the receiving circuit 32, which is connected to the path memory 29.

Two types of payload cells are transmitted via the ring connections 15 and 18 of the first ring and via the ring connections 19 and 22. On the one hand they are user cells (or generally referred to as user packets) containing in the information field, for example, messages or data of the user of a previously established connection and, on the other hand, control cells (or generally referred to as control packets) containing control information in their information field.

In the following, the ring connections 15 and 19 will also be referred to as receive lines assigned to the network node, and the ring connections 18 and 22 as the transmit lines assigned to the network node.

Certain bits in the header field of the cell are reserved for the VCI (Virtual Channel Identifier). In conformity with standardization proposals, this indication contains an indirect address for the destination of a cell and thus denotes a virtual channel. Furthermore, certain bits in the header field of the cell are reserved for the VPI (Virtual Path Identifier) which indicates a group of a plurality of virtual channels.

Certain bits of the VCI and of the VPI in this exemplary embodiment are used for other information than discussed in the standardization proposals. The VPI contains information about the address (address information) or destination (network node) of a cell in a ring system. The VCI is used for indicating the user-related identifier for a channel, the type of channel and the type of cell. Furthermore, the VCI is used as an address for a ring system.

The control arrangement 8 of the network interface 5 controls the setting up of a connection of an assigned station to other stations. The respective control procedures for setting-up connections and for disconnections may be taken from, for example, European patent application EP-0 641 105 A2.

The path memories 27 to 29 of the switching device 6 contain information, which is evaluated by the assigned receiving circuits 30 to 32, for organizing the further processing and transfer of the received cells. For example, a cell may be given another address, may be copied or erased. The path memories 27 to 29 may be changed by the control arrangement 8 from, for example, in the event of a fault (cable rupture or line rupture, respectively).

In a connection between a network node of a first ring system (of an ATM network) and a network node of a second ring system, the VPI and the VCI of the cell are to be changed when the cell changes from one ring system to another. For this purpose, prior to the setting up of the connection, respective entries have been made in the path memories.

When a fault occurs in the local area network, various measures are carried out by the network node that detects a fault. For example, a ring connection or a station connection may be interrupted, or a network node may break down (node failure). Such a fault is detected by the control arrangement 8 of a network interface or of a network node respectively, for example, after a neighboring node has transmitted control cells which are not received, or as a result of the loss of synchronization. EP 0 871 344 A2 describes how the individual cases of defects     simplex cable rupture (only cables of the same ring are broken, the other ring remains intact),
    duplex cable rupture,
    isolated node, and
    isolated group of nodes are handled by suitable loop circuits.

For a precise classification, definitions from EP 0 871 344 A2 are used. The cyclic node numbering used in EP 0 871 344 A2 indicates rising cyclic node numbers along the inner ring. The node having the smallest absolute address receives the cyclic node number 0. Absolute addresses are not shown in the following Figures, but only cyclic node numbers.

Figure 3:
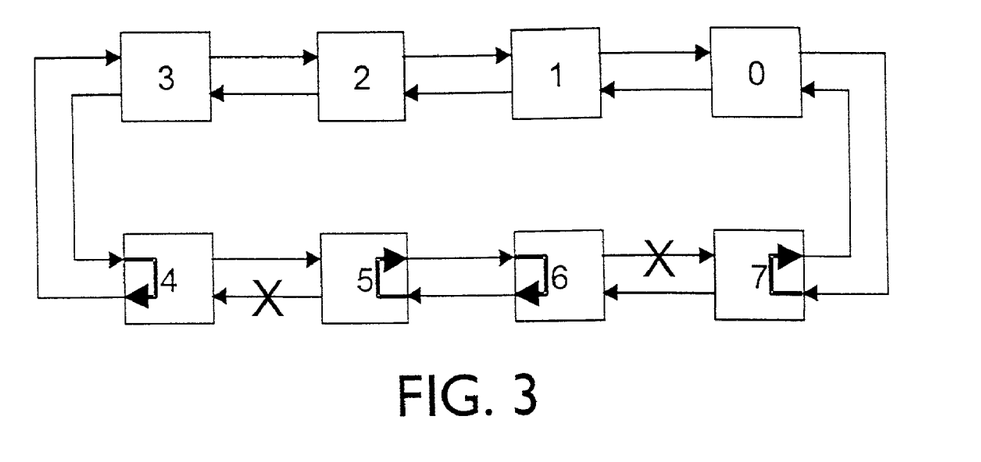

FIG. 3 shows an isolated node group of type A consisting of nodes 5 and 6, which is characterized in that a cable on the inner ring and a cable on the outer ring respectively is broken, without this being a duplex cable rupture.

Figure 4:
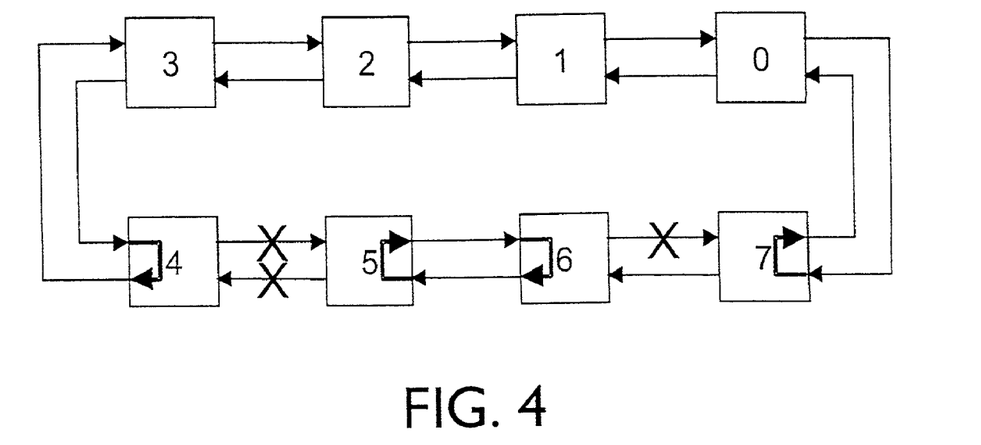
Figure 5:
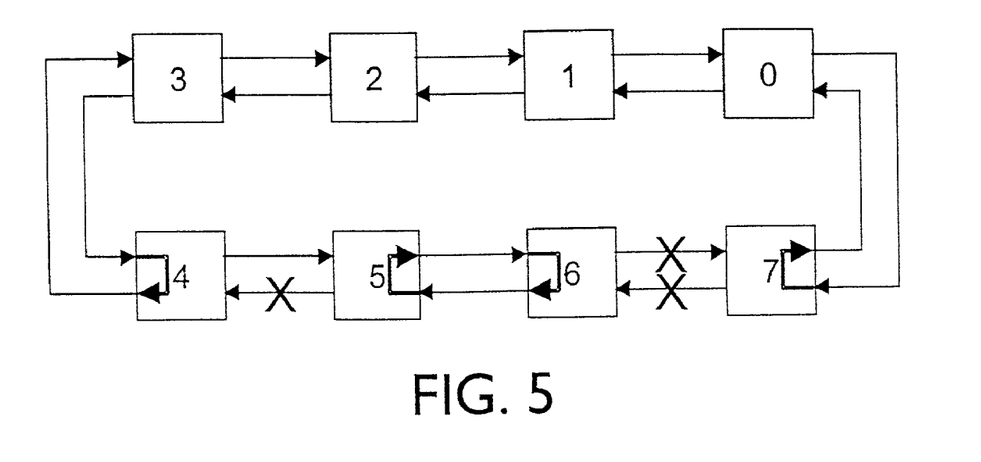

FIGS. 4 and 5 show an isolated node group of type B consisting of the nodes 5 and 6, which is characterized in that the duplex cable between the nodes 4 and 5 (FIG. 4) or the duplex cable between the nodes 6 and 7 (FIG. 5 respectively), is broken and there is a further simplex cable rupture on the inner ring between the nodes 6 and 7 (FIG. 4) or a further simplex cable rupture on the outer ring between the nodes 4 and 5 (FIG. 5).

Figure 6:
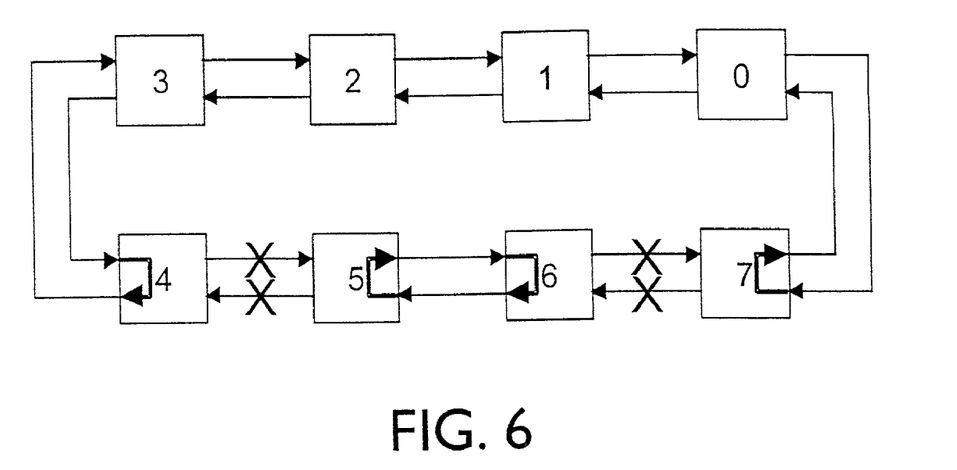

FIG. 6 shows the case of two duplex cable ruptures between nodes 4 and 5 and between nodes 6 and 7. In this case there are two isolated node groups of type C, the one consisting of nodes 5 and 6 and the other consisting of nodes 7, 0, 1, 2, 3 and 4.

Corresponding definitions hold for an isolated node of type A, B or C.

As a result of the switched loops in FIGS. 3 to 6 according to the method described in EP 0 871 344 A2, always two closed sub-rings are developed. One sub-ring consists of the nodes 5 and 6 and the other of the nodes 7, 0, 1, 2, 3 and 4.

The node 5 is called inner end node (because it has switched a loop from the inner to the outer ring) and node 6 is called outer end node of the closed sub-ring (because it has switched a loop from the outer to the inner ring) consisting of the nodes 5 and 6. The node 4 is called inner end node and node 7 outer end node of the closed sub-ring consisting of the nodes 7, 0, 1, 2, 3 and 4.

In the following is explained how, starting from each failure after a step-by-step repair of the cables or failed nodes, the ring system again changes to an error-free state without loop circuits. The complex cases of defects (isolated node, isolated node group) are brought back to the simple (simplex cable rupture, duplex cable rupture) defects. Basically, it is possible that, for example, in the case of a duplex cable rupture, the two cables are repaired simultaneously. Nevertheless, the messages generated by the algorithm according to the invention during the repair are generated successively, so that the step-by-step monitoring is necessary and also possible.

From the point of view of the mechanism according to the invention the repair of a failed node is synonymous with the repair of the broken cable of an isolated node of type A. The mechanism is referred to here as R2N reconfiguration (R2N=Return-To-Normal operation). In contrast, the reconfiguration described in EP 0 871 344 A2 after the cable rupture is referred to as SH reconfiguration here. (SH=Self-Healing).

The canceling of loop circuits and the respective change of the individual table entries by broadcast or distribution messages when individual cable ruptures are remedied step-by-step is controlled by the following 7 rules which are to be used when the tables are evaluated:

Rule 1:
Always when a node x detects that its originally defective receive line of the inner ring is intact again, it generates a repair message of the first type of the form $([x-1]_{mod\,R}, 2, 0)$, replaces the table entry $([x-1]_{mod\,R}, 1, 0)$ by this new entry and sends this repair message of the first type over the two rings. Always when a node x detects that its originally defective receive line of the outer ring is intact again, it generates a repair message of a first type of the form $([x+1]_{mod\,R}, 0, 2)$, replaces the table entry $([x+1]_{mod\,R}, 0, 1)$ by this new entry and sends this repair message of the first type over the two rings. Then [Y]mod R stands for the integral remainder after division of y by R, where R denotes the number of ring nodes.

In the following a loop message or repair message is written in the form (x, y, z) or (xyz) or xyz.

Rule 2:
A node y (y∈0,1, . . . R–1), which receives the repair message of the first type (y, 2, 0) or (y, 0, 2), replaces the respective entries (y, 1, 0) or (y, 0, 1 respectively) in the table by the repair messages of the first type and evaluates the thus changed table. Under the following conditions a) to i) the node y cancels its loop which reroutes packets or cells respectively to the outer ring or reroutes the packets or cells to the inner ring and removes the repair messages of the first type (y, 2, 0) or (y, 0, 2) from the table. Subsequently, the node y sends the repair messages of the second type (y, 3, 0) and (y, 0, 3) respectively:

The table contains only a single repair message (originally a single simplex line defect occurred).

The table contains a plurality of loop messages and repair messages of the first type or repair messages of the first type, but all the entries relate to exactly one of the two rings, such as, for example, in 4 1 0
6 1 0
7 2 0

If node 7 finds these entries during the table evaluation, it removes the entry (7 2 0) and sends the repair message of the second type (7 3 0) to all the ring nodes.

The table contains exactly one entry of the loop message type and exactly one entry of the first type of repair message $([y-1]_{mod\,R}, 1, 0)$, (y, 0, 2), or $([y-1]_{mod\,R}, 2, 0)$, (y, 0, 1)), while one of the entries relates to the inner ring and the other to the outer ring such as, for example, in 4 1 0
5 0 2

Such entries then occur exactly when a cable of a (single) broken duplex ring cable was repaired and the detecting node 4 has sent the repair message (5 0 2) to all the nodes. It should be considered that in the case of an isolated group of nodes or an isolated node, the table always has four table entries in all the nodes after all the loop messages (of the first and second type) have been received, of which entries always two refer to the inner ring and two refer to the outer ring. Therefore, a table having the entries 7 0 1
5 1 0 is only possible for a short while, as long as not all the loop messages that are sent in the case of the isolated node group 5, 4, 3, 2, 1, 0 . . . , 7 during the SH reconfiguration, have reached the nodes.

The table contains two loop messages relating to the same ring and two repair messages of the first type which relate to the other ring, such as, for example, 7 0 2
6 1 0
5 0 2
4 1 0

This situation arises when in the case of an isolated node or an isolated node group cables are repaired.

The table each time contains a loop message and a repair message of the first type both on the inner ring and on the outer ring such as, for example, in 7 0 2
6 2 0
5 0 1
4 1 0

The table contains two repair messages of the first type relating to one of the rings, and are a repair message of the first type and a loop message which refer to the other ring such as, for example, in 7 0 2
6 2 0
5 0 2
4 1 0

The table contains two loop messages, one for each ring, and a repair message, which relates to one of the rings, such as, for example, in 7 0 1
6 1 0
5 0 2

The table contains two repair messages of the first type which relate to the same ring and one loop message which relates to the other ring such as, for example, in 7 0 2
6 1 0
5 0 2

The table contains two loop messages which relate to the same ring and a repair message of the first type which relates to the other ring, such as, for example, in 6 1 0
5 0 2
4 1 0

Remark 1:

It should be remarked that, in contrast, a single repair message of the first type does not cause a loop circuit to be canceled when the table contains two loop messages relating to the same ring and contains a loop message and a repair message of the first type relating to the other ring, such as, for example, in 7 0 1
6 1 0
5 0 1
4 2 0.

With table entries of this type node 4 would not cancel the loop circuit. Nodes 5, 6 or 7 would, however, as a result of a repair message of the second type (4 3 0) remove the entry (4 2 0) without a reactivation of the SH reconfiguration.

Rule 3:

Rule 3 relates to the renewed testing of the receive cable and, should the occasion arise, renewed transmission of repair messages that have already been detected before. A network node receiving a repair message of the first type and whose cyclic node number appears in the status table, again checks its receive cable when, in addition, the said network node, according to its table entries, is no longer an end node of an isolated node group or of a closed sub-ring (relevant for isolated nodes or isolated node group of type A and type B), and sends a respective repair message of the first type when the receive cable is intact but the respective table entry shows a defect, or the respective table entry represents a repair message of the first type (renewed transmission of a repair message of the first type).

Rule 4:

Rule 4 relates to the removal of repair messages of the first type from the table. If the node x receives the repair message of the second type (y, 3, 0) or (y, 0, 3), it removes the respective repair message (y, 2, 0) or (y, 2, 0) respectively from its table. It is then impossible for x and y to correspond, because transmitting a message to all the nodes means that the transmitting node erases its transmitted message without a further evaluation when it again receives the message after the message has passed through a ring. The network node that transmits the repair message of the second type (y, 3, 0) or (y, 0, 3) respectively, removes the entry (y, 2, 0) or (y, 0, 2) respectively, immediately after the repair message of the second type has disappeared. A node that receives the repair message of the second type (y, 3, 0) or (y, 0, 3) respectively, but does not contain a respective repair message of the first type (y, 2, 0) or (y, 0, 2) respectively in its table, ignores the repair message of the second type.

Rule 5:

A node x, which receives the repair message of the first type (y, 2, 0) or (y, 0, 2) respectively, but has no corresponding loop message (y, 1, 0) or (y, 0, 1) in its table, ignores the repair message of the first type (y, 2, 0) or (y, 0, 2).

Rule 6:

Repair messages of the first and the second type are not involved in the available loop circuits i.e. they are always conveyed from the receive line of a ring to the transmit line of the same ring. If this transmit line is defective, the repair message is lost. If the transmit line is not defective i.e. the loop circuit was formed by an isolated node or an isolated node group of type A or type B, the repair message reaches the isolated node or the isolated node group.

Rule 7:

Messages which are sent to all the nodes (distribution or broadcast messages) are always simultaneously sent on the two rings.

After a status table in a node has been changed, the respective node evaluates the status table, cancels a loop as the case may be and sends a repair message of the first or second type.

Figure 7:
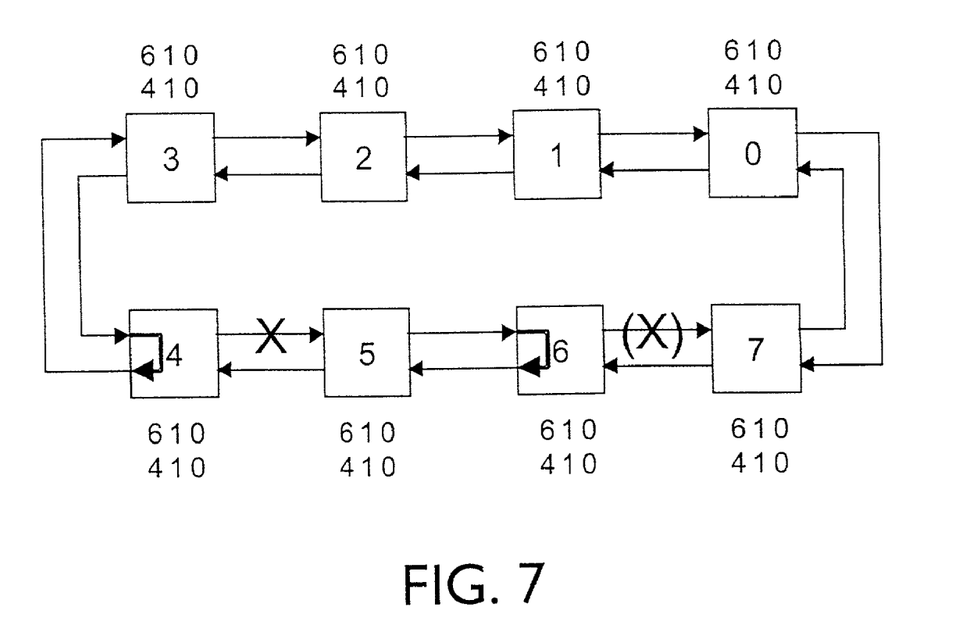

FIG. 7 shows the process of the R2N reconfiguration in the case of two simplex cable ruptures on the inner ring between the nodes 4 and 5 and between the nodes 6 and 7. The table entries shown relate to the situation after the SH reconfiguration. The broken cable between nodes 6 and 7 is repaired. The node 7 detects this repair and sends the repair message of the first type (6 2 0) in accordance with rule 7 by means of a broadcast or distribution message to all the nodes after it itself has made this entry in its status table. These nodes receive the message and replace the entry (6 1 0) in their status table by (6 2 0). All the nodes then evaluate the status table. Node 6 recognizes that, according to rule 2 b), it has to cancel its loop circuit. Immediately after the loop circuit has been canceled, node 6 removes the entry (6 2 0) from its status table and sends the repair message of the second type (6 3 0) to all remaining nodes. This message is received by the remaining nodes and they remove their table entry (6 2 0) in accordance with rule 4. The table entry (4 1 0) remains in all the nodes, which entry corresponds to the still existing cable rupture between nodes 4 and 5 on the inner ring and the switched loop (inner ring to outer ring) in node 4. The handling of the R2N reconfiguration takes place in like manner when also the cable between nodes 4 and 5 is repaired, so that the ring is fully intact again.

Figure 8:
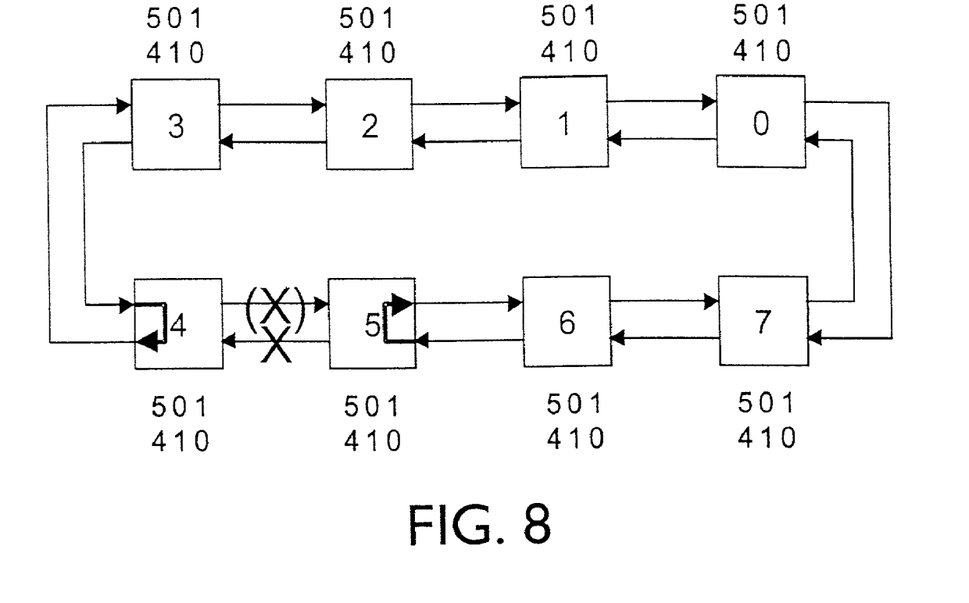

FIG. 8 shows the process of the R2N reconfiguration in the case of a single duplex cable rupture between nodes 4 and 5. The table entries shown relate to the situation in accordance with the SH reconfiguration. First the cable of the inner ring between nodes 4 and 5 is repaired. Node 5 detects that its receive cable of the inner ring is intact again and sends the repair message of the first type (4 2 0) to all the nodes, after it has made this entry into its status table. The remaining nodes receive this repair message, replace their table entry (4 1 0) by (4 2 0) and evaluate their changed status table. Node 4 then recognizes that its send cable of the inner ring is intact again, it cancels the loop circuit (inner ring to outer ring) in accordance with rule 2 c), removes the table entry (4 2 0) and sends the repair message of the second type (4 3 0) to all the nodes. The other nodes receive this repair message and remove their table entry (4 2 0) in accordance with rule 4. According to FIG. 7, the R2N reconfiguration takes place when also the cable of the outer ring between nodes 4 and 5 is repaired, so that the ring is fully intact again.

Figure 9:
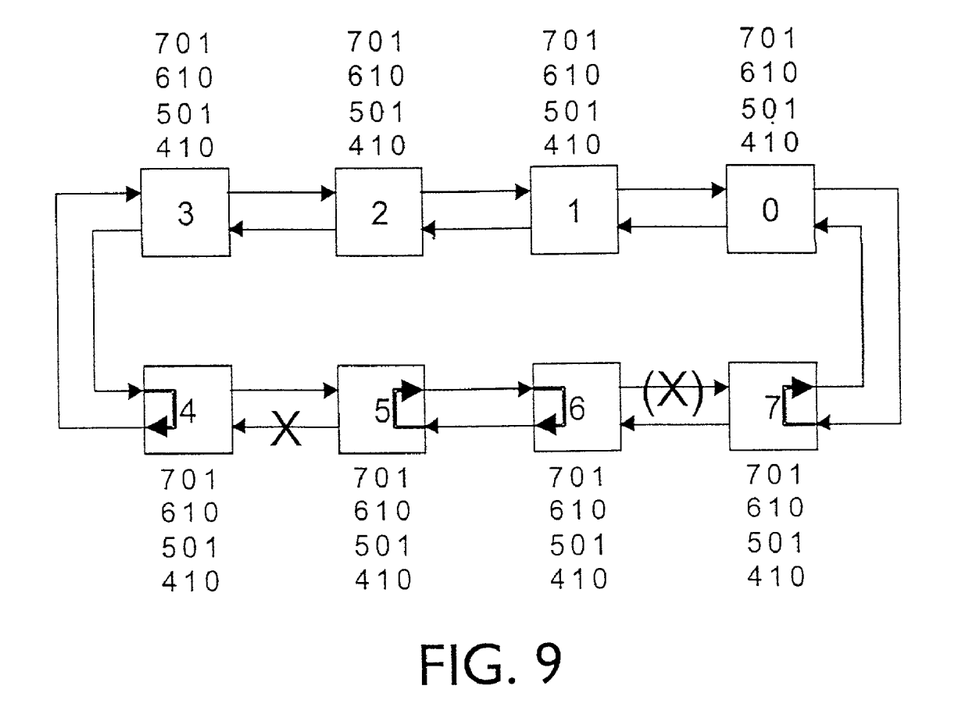

FIG. 9 shows the process of the R2N reconfiguration in the case of an isolated node group of type A. The table entries shown relate to the situation after the SH reconfiguration. The cable of the inner ring between nodes 6 and 7 is broken and so is the cable of the outer ring between nodes 4 and 5.

Let us assume that the cable of the inner ring between nodes 6 and 7 is repaired. Node 7 detects that its receive cable on the inner ring is intact again, replaces the table entry (6 1 0) by (6 2 0) and sends the repair message of the first type (6 2 0) to all the nodes. All the nodes receive the message, replace in their table the entry (6 1 0) by (6 2 0) and evaluate the table. In accordance with rule 6 the nodes 5 and 6 also receive the repair message of the first type from node 7 via the inner ring, because the node 4 does not reroute such a repair message via the outer ring but to the next node 5.

Nodes 4 and 7 detect that they are, like before, end nodes of the closed sub-ring consisting of 7, 0, 1, 2, 3 and 4 (relevant table entries (7 0 1) and (4 1 0)). As a result, nodes 4 and 7 do not take any further steps in accordance with rule 3. On the other hand, nodes 5 and 6 detect that they are no longer end nodes of an isolated node group (the relevant entries are (6 2 0) and (5 0 1)). The entries (6 1 0) and (5 0 1) would mean that the nodes 5 and 6 form an isolated node group and are therefore end nodes.

It is true, the table of node 6 contains a single repair message of the first type, that is, the entry (6 2 0). In accordance with the remark 1, rule 2, this does not lead to the fact that node 6 cancels its loop circuit now already, because this is the only repair message in the table.

According to rule 3, nodes 5 and 6 check their receive cable:

The node 6 detects that its receive cable on the outer ring is intact, although its table contains the entry (7 0 1). In consequence, the node 6 replaces the entry (7 0 1) by (7 0 2) and sends the repair message of the first type (7 0 2) to all remaining nodes.

The node 5 detects that its receive cable on the inner ring is intact, although its table contains the entry (4 1 0). In consequence, node 5 replaces the entry (4 1 0) by (4 2 0) and sends the repair message of the first type (4 2 0) to all remaining nodes.

These two messages are received by all the nodes. Depending on which node is concerned, (7 0 2) is received prior to (4 2 0) and the other way around. Irrespective of the order of reception, the tables, after reception of the first one of these two messages, contain two repair messages of the first type, so that in accordance with rule 2 d) or rule 2 e) respectively, the nodes 4, 6 and 7 cancel their switched loops and send the repair messages of the second type (4 3 0), (6 3 0) or (7 0 3) respectively. Since these repair messages of the second type are not sent until after the respective messages of the first type, it is impossible for a node to receive, for example, the repair message of the second type (4 3 0) prior to the repair message of the first type (4 2 0). Thus, after transmission and reception of all the repair messages and a table evaluation with entries put in and removed from all these status tables there is only one entry (5 0 1) left. Then only the node 5 has switched a loop (outer ring to inner ring). When this last cable rupture is repaired, the R2N reconfiguration follows according to the pattern described in FIG. 7 so that the whole ring is again free of defects and all status tables are empty.

Figure 10:
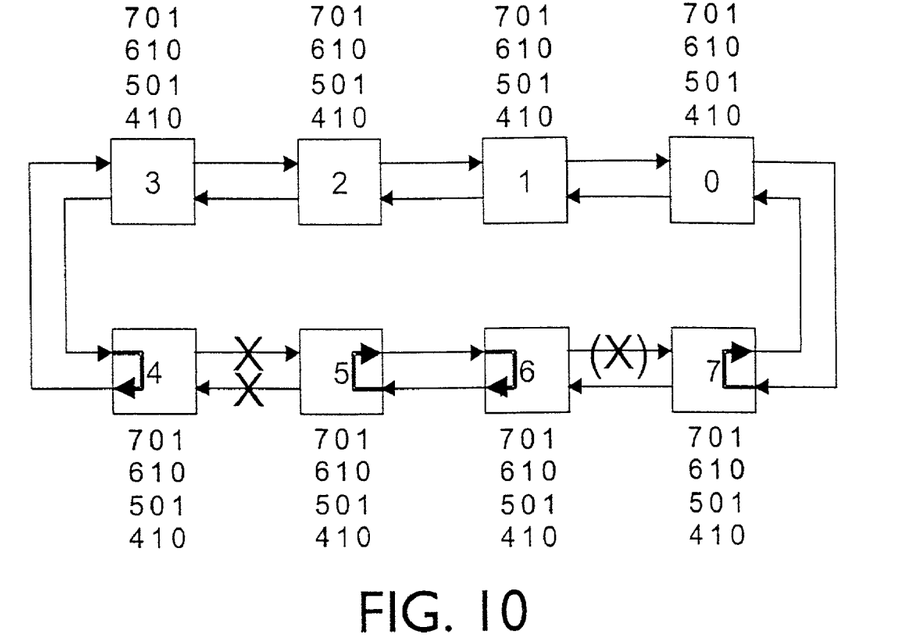

FIG. 10 shows the process of the R2N reconfiguration in the case of an isolated node group of type B. A cable repair leaves a single duplex cable rupture behind. The table entries shown relate to the situation after the SH reconfiguration. The cable of the inner ring between nodes 6 and 7 is broken as is the duplex cable between nodes 4 and 5. Let us assume that the cable of the inner ring between the nodes 6 and 7 is repaired. The node 7 detects that its receive cable of the inner ring is intact again, it replaces the table entry (6 1 0) by (6 2 0) and sends the repair message of the first type (6 2 0) to all the nodes. All the nodes receive the message, replace the table entry (6 1 0) by (6 2 0) and evaluate their tables. Nodes 4 and 7 detect that they are, as there were before, the end nodes of the closed sub-ring, which consists of the nodes 7, 0, 1, 2, 3 and 4 (relevant table entries (7 0 1) and (4 1 0)). As a result, according to rule 3, the nodes 4 and 7 do not take any further measures. On the other hand, nodes 5 and 6 detect that they are no longer end nodes of an isolated node group (the relevant entries are now (6 2 0) and (5 0 1)). The table of node 6 contains a single repair message of the first type, it is true, that is, the entry (6 2 0). In accordance with remark 1, rule 2, this does not lead to the fact that node 6 now already cancels its loop circuit, because this is the only repair message in the table.

In accordance with rule 3, nodes 5 and 6 check their receive cable:

The node 6 detects that its receive cable on the outer ring is intact, although its table contains the entry (7 0 1). As a result, node 6 replaces the entry (7 0 1) by (7 0 2) and sends the repair message of the first type (7 0 2) to all remaining nodes.

The node 5 detects that its receive cable on the inner ring in accordance with table entry (4 1 0) is defective. Consequently, node 5 does not take any further steps.

The repair message (7 0 2) is received by all the nodes, it replaces the entry (7 0 1) in all the tables. Thus all the tables contain exactly two repair messages of the first type. The table evaluation in node 7 causes, in accordance with rule 2 e), node 7 to cancel its loop circuit (outer ring to inner ring), to remove the entry (7 0 2) and send the repair message of the second type (7 0 3) to all the nodes. The table evaluation in node 6 causes, in accordance with rule 2 e), node 6 to cancel its loop circuit (inner ring to outer ring), to remove the entry (6 2 0) and send the repair message of the second type (6 3 0) to all the nodes. The remaining nodes receive the repair messages (7 0 3) and (6 3 0) (partly in a different order), remove the entries (7 0 2) and (6 2 0), so that, finally, all the nodes contain only the table entries (4 1 0) and (5 0 1) in accordance with the broken duplex cable between nodes 4 and 5. The R2N reconfiguration of the broken duplex cable takes place in accordance with the process described with reference to FIG. 8.

Figure 11:
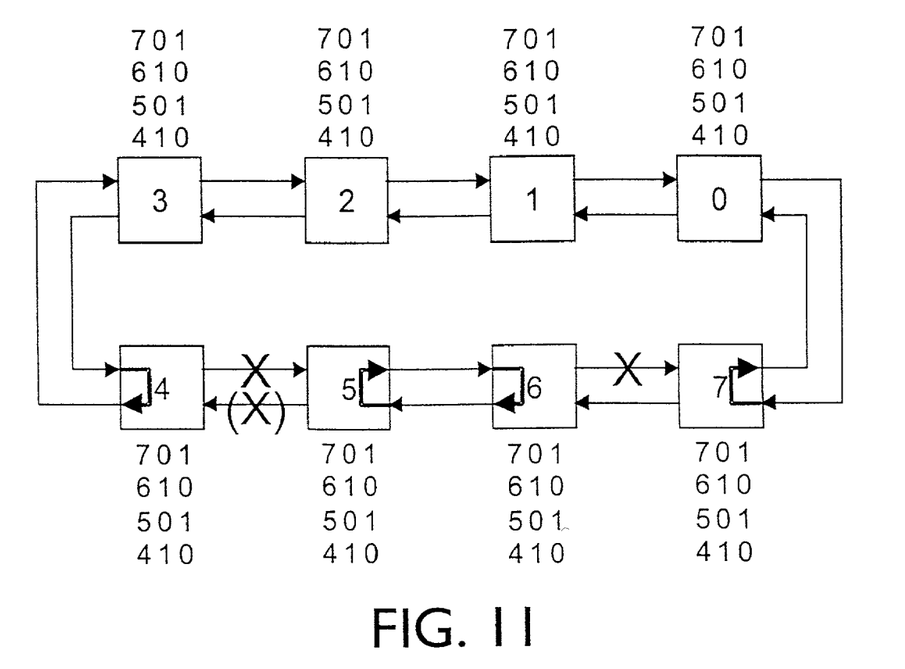

FIG. 11 shows the process of the R2N reconfiguration in the case of an isolated node group of type B. After a cable repair there are still two simplex cable ruptures on the inner ring. The table entries shown relate to the situation after the SH reconfiguration. The cable of the inner ring between nodes 6 and 7 is broken as is the duplex cable between nodes 4 and 5. Let us assume that the cable of the outer ring between nodes 4 and 5 is repaired. Node 4 detects that its receive cable on the outer ring is intact again. It replaces the table entry (5 0 1) by (5 0 2) and sends to all the nodes the repair message of the first type (5 0 2), which nodes all receive the message, replace the table entry (5 0 1) by (5 0 2) and evaluate their tables. The nodes 4 and 7 detect that they, like before, are end nodes of the closed sub-ring and which sub-ring consists of the nodes 7, 0, 1, 2, 3 and 4 (relevant table entries (7 0 1) and (4 1 0)). As a result, nodes 4 and 7 do not take any further steps, which is in accordance with rule 3. On the other hand, nodes 5 and 6 detect that they are no longer end nodes of an isolated node group (the relevant entries are now (6 1 0) and (5 0 2)).

The table of node 5 contains a single repair message of the first type, it is true, that is, the entry (5 0 2). According to remark 1, rule 2 however, this does not lead to the fact that node 5 already now cancels its loop circuit, because this is the only repair message in the table. In accordance with rule 3 nodes 5 and 6 check their receive cable:

The node 6 detects that its receive cable on the outer ring is intact, although its table contains the entry (7 0 1). As a result, node 6 replaces the entry (7 0 1) by (7 0 2) and sends the repair message of the first type (7 0 2) to all remaining nodes.

The node 5 detects that its receive cable on the inner ring in accordance with table entry (4 1 0) is defective. Consequently, node 5 does not take any further steps.

The repair message (7 0 2) is received by all the nodes, it replaces the entry (7 0 1) in all the tables. Thus all the tables contain exactly two repair messages of the first type. The table evaluation in node 7 causes node 7 to cancel its loop circuit (outer ring to inner ring) in accordance with rule 2 e), to remove the entry (7 0 2) and send the repair message of the second type (7 0 3) to all the nodes. The table evaluation in node 5 causes node 5 to cancel its loop circuit (outer ring to inner ring) in accordance with rule 2 e), to remove the entry (5 0 2) and send the repair message of the second type (5 0 3) to all the nodes. The remaining nodes receive the repair messages (7 0 3) and (5 0 3) (partly in a different order), remove the entries (7 0 2) and (5 0 2) in accordance with rule 4, so that, finally, all the nodes contain only the table entries (4 1 0) and (6 1 0) in accordance with the two simplex cable ruptures on the inner ring between nodes 4 and 5 and between 6 and 7. The R2N reconfiguration of the two simplex cable ruptures left takes place in accordance with the process described with reference to FIG. 7.

Figure 12:
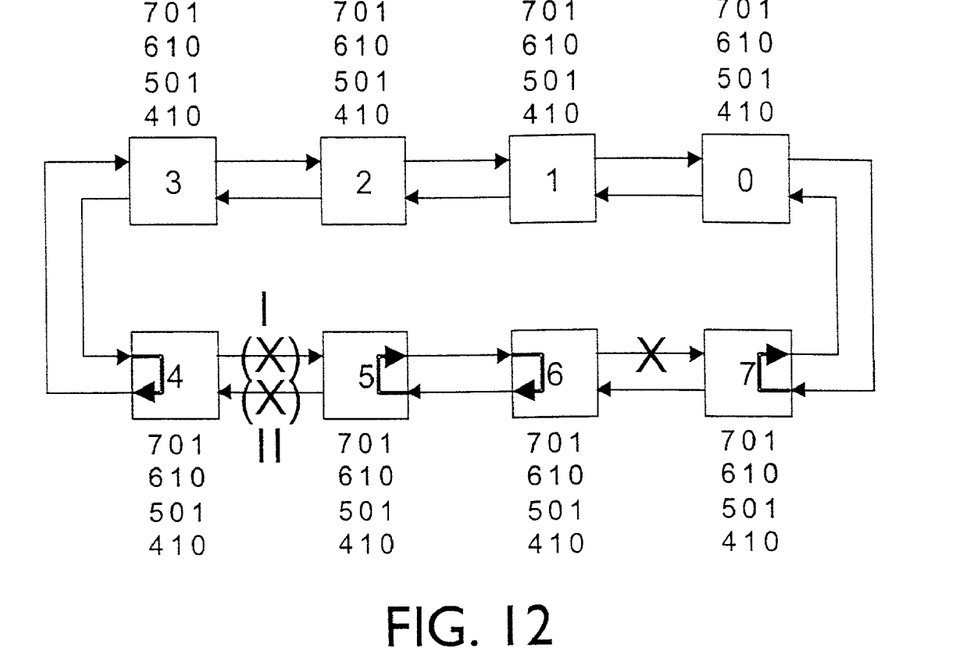

FIG. 12 shows the process of the R2N reconfiguration in the case of an isolated node group of type B. A first cable repair leads to an isolated group of type A and a second cable repair to a simplex cable rupture in the inner ring between nodes 6 and 7. The table entries shown relate to the situation after the SH reconfiguration. The cable of the inner ring between nodes 6 and 7 is broken as is the duplex cable between nodes 4 and 5.

Now the cable of the inner ring between nodes 4 and 5 is repaired. Node 5 detects that its receive cable of the inner ring is intact again, replaces the table entry (4 1 0) by (4 2 0) and sends the repair message of the first type (4 2 0) to all the nodes. This time, however, as a result of the still existing cable rupture, only the node 6 receives this message; it replaces the table entry (4 1 0) by (4 2 0) and evaluates its tables. Nodes 5 and 6 are still end nodes of an isolated group (relevant table entries are (5 0 1) and (6 1 0)), so that, in accordance with rule 3, they do not take any further steps. The nodes 7, 0, 1, 2, 3, 4 do not notice anything about the first repair, because the repair message (4 2 0) does not reach them.

Subsequently, the cable of the outer ring between nodes 4 and 5 is repaired. Node 4 detects that its receive cable on the outer ring is intact again, replaces the entry (5 0 1) by (5 0 2) and sends the repair message of the first type (5 0 2) to all the nodes. This message is now received by all the nodes, they replace the entry (5 0 1) by (5 0 2) and evaluate their table.

The nodes 5 and 6 contain in their tables only two repair messages of the first type ((4 2 0) and (5 0 2)), whereas the nodes 7, 0, 1, 2, 3 and 4 of the other closed sub-ring have only the repair message (4 2 0) in their tables. This entry, however, is sufficient for the nodes 4 and 7 to recognize on reception of the next repair message that they are no longer edge nodes of a closed sub-ring, so that they check their receive cable in accordance with rule 3.

The nodes 5 and 6 recognize that they are no longer edge nodes of an isolated group (relevant table entries (5 0 2) and (6 1 0)), so that they again check their receive cable, which is in accordance with rule 3:

The node 6 detectes that its receive cable on the outer ring is intact, although its table contains the entry (7 0 1). As a result, node 6 replaces the entry (7 0 1) by (7 0 2) and sends the repair message of the first type (7 0 2) to all remaining nodes.

The node 5 detects that its receive cable on the inner ring is intact in accordance with table entry (4 2 0). Consequently, node 5 again sends to all remaining nodes the repair message of the first type (4 2 0). In addition, node 5 recognizes from the entry (5 0 2) that it has to cancel its switched loop. After it has canceled the loop, node 5 removes the entry (5 0 2) and send the repair message of the second type (5 0 3) to all the nodes.

The nodes 7, 0, 1, 2, 3 and 4 receive the repair message (4 2 0) sent for the second time and the repair message (7 0 2) sent for the first time. After the reception of the first one of these two repair messages, their status tables contain yet a further repair message in addition to the entry (5 0 2). Node 4, which receives the message (4 2 0) first because it is connected directly to node 5, can therefore cancel its loop in accordance with rule 2 e), remove the entry (4 2 0) and send the repair message of the second type (4 3 0) to all the nodes.

The node 7, which can receive the repair message (7 0 2) from the node 6 only over the inner ring, consequently receives this message after the repair messages (5 0 2) and (4 2 0), so that after reception of the first one of these messages, that is, (5 0 2), it contains two repair messages of the first type in its table, it is true, but still cannot cancel its switched loop (for this purpose it needs to have the entry (7 0 2)). In fact the node 7 recognizes, in accordance with rule 3, that it is no longer an end node of a closed sub-ring, and then checks its receive cable in accordance with rule 3. But it does not establish a contradiction between the table entry (6 1 0) and its still defective receive cable of the inner ring. Therefore, the reception of the first message (5 0 2) does not cause node 7 to take any further steps. After (5 0 2) node 7 receives the repair message (7 0 2) (or possibly prior to that (5 0 3)), which causes node 7, after an entry into the table and table evaluation (in accordance with rule 2 f)) when (5 0 3) has not yet been received and in accordance with rule 2 h) when (5 0 3) had previously been received), to cancel the switched loop (outer ring to inner ring), to remove the table entry (7 0 2) and send the repair message (7 0 3) to all the nodes.

After detecting that its receive cable of the outer ring is intact again (in accordance with repair message (5 0 2)) the node 4 receives the repair message (4 0 2) and then (7 0 2). When (4 2 0) is received, the node 4 checks its receive cable in accordance with rule 3, because it is no longer an edge node of a closed sub-ring. The renewed sending of the repair message (5 0 2) in accordance with rule 3 is not necessary in the present case, it is true, but necessary on grounds of the simple rules for the R2N reconfiguration.

Thus, all the nodes have received the repair messages (4 2 0), (5 0 2) and (7 0 2) as well as (4 3 0), (5 0 3) and (7 0 3) in a possibly different order, while the respective loop circuits were canceled. All the nodes then have only the entry (6 1 0) in their tables, in accordance with the only still broken cable on the inner ring between nodes 6 and 7. When this last simplex cable rupture is repaired, the R2N reconfiguration takes place according to the process described with reference to FIG. 7, so that the whole ring is again error free and all the status tables are empty.

Figure 13:
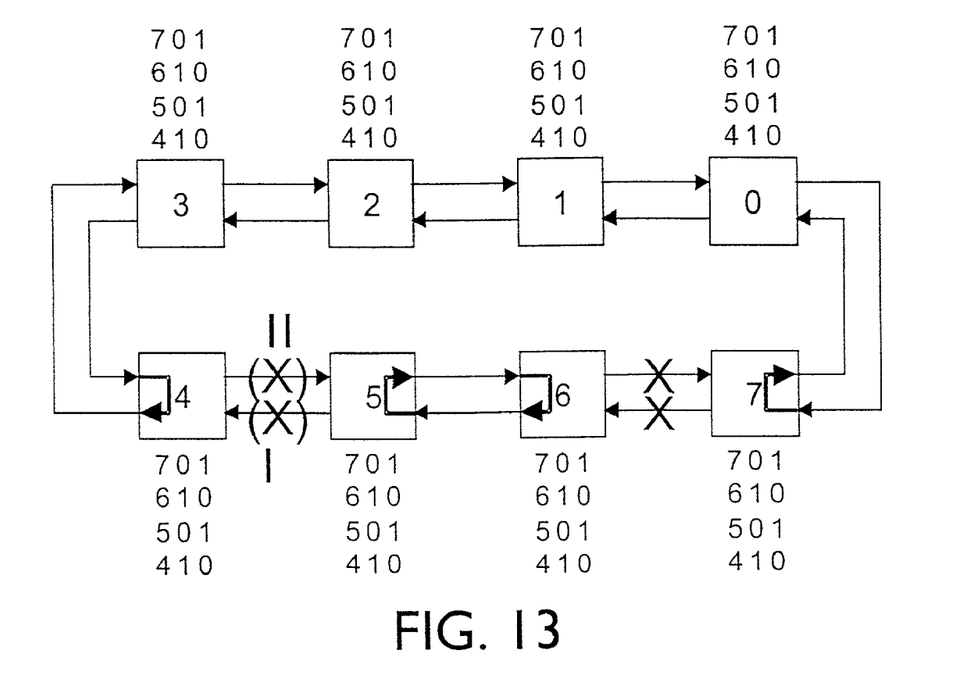

FIG. 13 shows the process of the R2N reconfiguration in the case of two isolated node groups of type C. Two successive cable repairs then still leave a single duplex cable rupture behind. The table entries shown relate to the situation after the SH reconfiguration. The duplex cable between nodes 6 and 7 is broken as is the duplex cable between nodes 4 and 5. First the cable of the outer ring between nodes 4 and 5 is repaired. Node 4 detects that is receive cable of the inner ring is intact again, replaces the table entry (5 0 1) by (5 0 2) and sends to all the nodes the repair message of the first type (5 0 2) which, however, is received only by the nodes 4, 3, 2, 1, 0 and 7, because the other nodes cannot be reached. Nodes 4 and 7 recognize in the table evaluation that they are, like before, end nodes of a closed sub-ring (relevant table entries (4 1 0) and (7 0 1)), so that, in accordance with rule 3, they do not check their receive cable.

Subsequently, the cable of the inner ring between the nodes 4 and 5 is repaired. Node 5 detects that its receive cable of the inner ring is intact again, replaces the table entry (4 1 0) by (4 2 0) and sends the repair message of the first type to all the nodes. This repair message now reaches all the nodes, which replace the entry (4 1 0) by (4 2 0) and evaluate the table. Thus the nodes 4, 3, 2, 1, 0 and 7 have only two repair messages in their table (5 0 2) and (4 2 0), whereas the nodes 5 and 6 contain only the repair message (4 2 0) in their respective table. The table evaluation in nodes 4 and 7 causes these nodes to recognize that they are no longer the end nodes of an isolated sub-ring (relevant table entries (4 2 0) and (7 0 1)), so that they check their receive cable:

The node 7 detects that its receive cable on the inner ring is still defective in accordance with the table entry (6 1 0). As a result, node 7 does not take any further steps.

The node 4 detectes that its receive cable on the outer ring is intact in accordance with table entry (5 0 2). Consequently, node 4 again sends the repair message of the first type (5 0 2) in accordance with rule 3, which message is received by all the nodes now. In addition, node 4, as a result of the table entry (4 2 0) cancels the loop circuit (inner ring to outer ring), removes the table entry (4 2 0) and sends the repair message of the second type (4 3 0).

The nodes 5 and 6 receive the repair message of the first type (5 0 2) and then the repair message of the second type (4 3 0). After the reception of the message (5 0 2), nodes 5 and 6 also have two repair messages in their table. In accordance with rule 3 the nodes 5 and 6 detect that they are no longer end nodes of a closed sub-ring (relevant table entries (5 0 2) and (6 1 0)), so that the two nodes check their receive cable:

The node 6 detects that its receive cable on the outer ring is still defective in accordance with the table entry (7 0 1). As a result, node 6 does not take any further steps.

The node 5 detects that its receive cable on the inner ring is intact, which is in accordance with table entry (4 2 0). Consequently, node 5 again sends a repair message of the first type (4 2 0) in accordance with rule 3.

As already observed above, the renewed sending of repair message (4 2 0) is not necessary in the present case, it is true, but based on the simple rules for the R2N reconfiguration, it is really necessary. Node 5 cancels the switched loop (outer ring to inner ring) due to the entry (5 0 2), removes the table entry (5 0 1) and sends the repair message (5, 0, 3) to all the nodes.

For the individual nodes it cannot be said for certain whether the repair message of the second type (4 3 0) sent by node 4 is received before the repair message of the first type (4 2 0) which is again sent by the node 5, because the order of reception depends on whether all the nodes have the same processing rate. According to rule 5, however, this is not important: either the message (4 2 0) is received prior to the message (4 3 0), when the message (4 2 0) does not change the table entries and the message (4 3 0) causes the entry (4 2 0) to be removed. Or, in the other case, when the message (4 3 0) is received prior to the message (4 2 0), the already available entry (4 2 0) is erased. The message (4 2 0) received afterwards is ignored because no entry (4 1 0) is available. Thus all the nodes receive the repair messages of the first type (4 2 0) and (5 0 2) and then the repair messages of the second type (4 3 0) and (5, 0, 3), so that in line with the still available loops in nodes 6 and 7, all the nodes only have the table entries (6 1 0) and (7 0 1).

Figure 14:
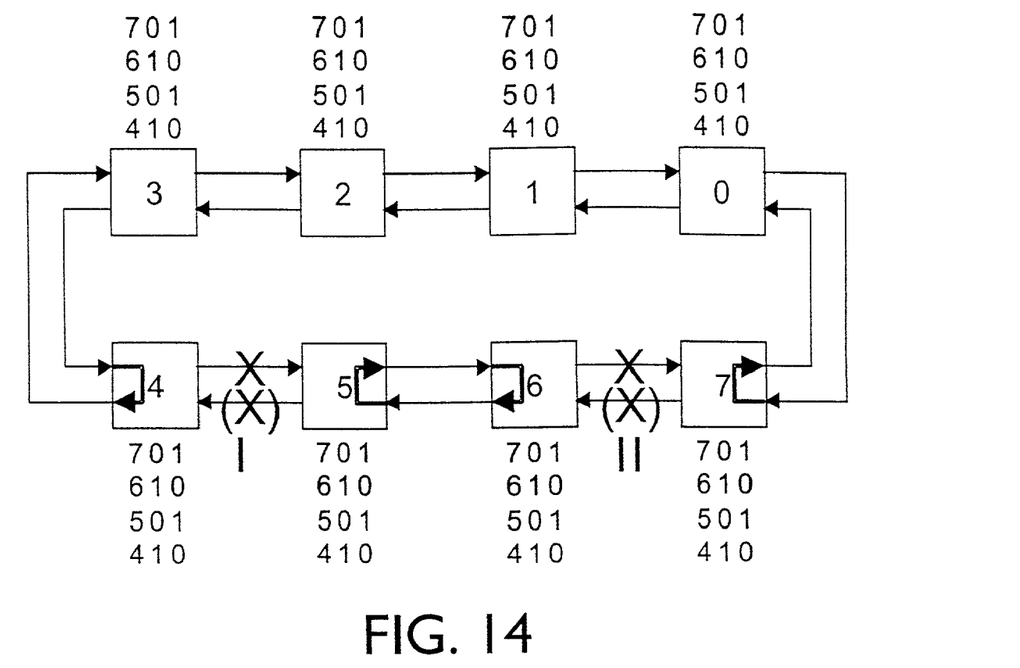

FIG. 14 shows the process of the R2N reconfiguration in the case of two isolated node groups of type C. After two successive cable repairs there are two simplex cable ruptures on the outer ring left. The table entries shown relate to the situation after the SH reconfiguration. The duplex cable between nodes 6 and 7 is broken as is the duplex cable between nodes 4 and 5.

First the cable of the outer ring between nodes 4 and 5 is repaired. Node 4 detects that its receive cable of the inner ring is intact again, replaces the table entry (5 0 1) by (5 0 2) and sends to all the nodes the repair message of the first type (5 0 2) which, however, is received only by the nodes 4, 3, 2, 1, 0 and 7, because the remaining nodes cannot be reached. Nodes 4 and 7 recognize during the table evaluation that they, like before, are end nodes of a closed sub-ring (relevant table entries (4 1 0) and (7 0 1)), so that in accordance with rule 3 they do not check their receive cable. Then, also the cable of the outer ring between nodes 6 and 7 is repaired. Node 6 detects that its receive cable on the outer ring is intact again, replaces the table entry (7 0 1) by (7 0 2) and sends all the nodes the repair message of the first type (7 0 2). This message is now received by all the nodes, which replace the entry (7 0 1) by (7 0 2) and evaluate their table.

The nodes 5 and 6 have so far contained only a single repair message (7 0 2) in their table. On the other hand, the tables of the nodes 4, 3, 2, 1, 0 and 7 contain the repair messages (5 0 2) and (7 0 2). Thus the nodes 4 and 7 are no longer edge nodes of an isolated node group (relevant table entries (4 1 0) and (7 0 2)), so that they check their receive cable in accordance with rule 3:

The node 7 detects that in accordance with its table entry (6 1 0) its receive cable of the inner ring is further defective and in this respect does not take any further steps. On the other hand, the table of node 7 contains two repair messages among which (7 0 2). As a result, node 7 cancels the switched loop (outer ring to inner ring) in accordance with rule 2 d), removes the entry (7 0 2) and sends the repair message of the second type (7 0 3) to all the nodes.

The node 4 detects that in accordance with its table entry (5 0 2) its receive cable on the outer ring is intact, and again sends the repair message of the first type (5 0 2) to all the nodes in accordance with rule 3.

The nodes 5 and 6 receive the repair message of the second type (7 0 3) prior to the repair message of the first type (5 0 2), because nodes 5 and 6 cannot be reached via the inner ring from node 4. On reception of the repair message (7 0 3), nodes 5 and 6 remove the entry (7 0 2) from their tables, so that these tables only contain the entries (6 1 0), (5 0 1) and (4 1 0). It is to be observed in this respect that despite the only three loop message entries the SH reconfiguration not again generates the just removed fourth entry. This is caused by the fact that the removed entry did not relate to the node 5 (see remark 1, rule 2). Subsequently, nodes 5 and 6 receive the repair message (5 0 2) and replace the entry (5 0 1) thereby. In accordance with rule 2 i) node 5 removes the loop circuit from the outer to the inner ring, removes the table entry (5 0 2) and sends the repair message of the second type (5, 0, 3) to all the nodes.

Thus, after receiving the repair messages of the first type (5 0 2) and (7 0 2), all the nodes have subsequently received the repair messages of the second type, so that all the nodes have only the table entries (4 1 0) and (6 1 0) in accordance with the still available loop circuits from the inner to the outer ring in the nodes 4 and 6. The R2N reconfiguration of the two remaining simplex cable ruptures is effected in accordance with the process described with reference to FIG. 7.

Figure 15:
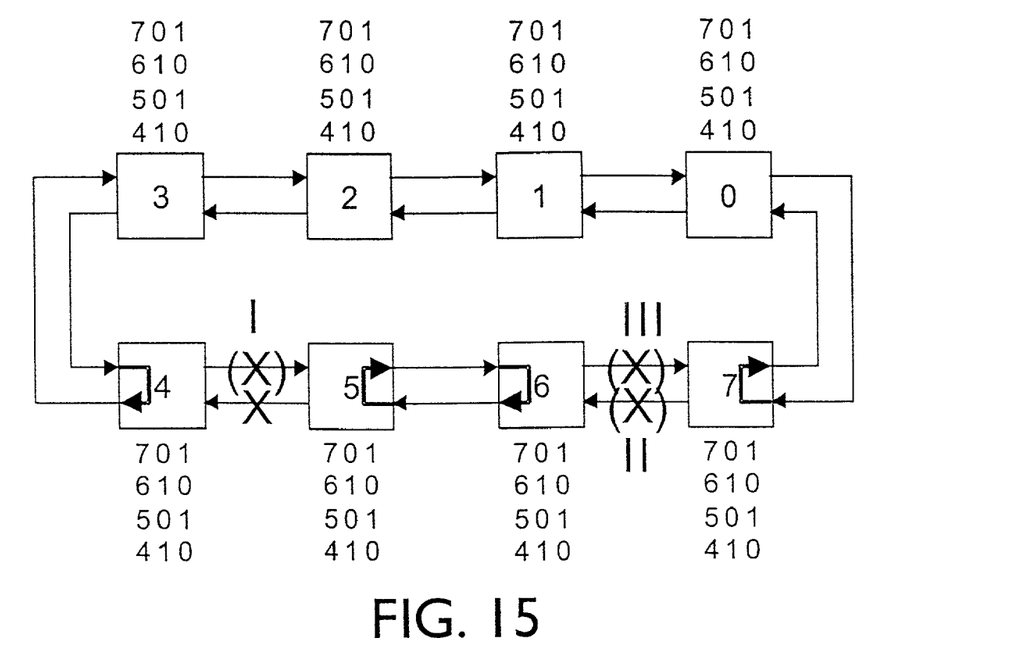

FIG. 15 shows the process of the R2N reconfiguration in the case of two isolated node groups of type C. After two successive cable repairs, there is an isolated node group of type A and a further cable repair leaves a single simplex cable rupture behind. The table entries shown relate to the situation in accordance with the SH reconfiguration. The duplex cable between nodes 6 and 7 is broken as is the duplex cable between the nodes 4 and 5.

First the cable on the inner ring between nodes 4 and 5 is repaired. The node 5 detects that its receive cable on the inner ring is intact again. It replaces in its table the entry (4 1 0) by (4 2 0) and sends the repair message of the first type (4 2 0) to all the nodes, which message, however, is received only by node 6, because the other nodes cannot be reached. The node 6 replaces the entry (4 1 0) by (4 2 0).

The next cable to be repaired is the cable on the outer ring between nodes 6 and 7. The node 6 detects that its receive cable on the outer ring is intact again, replaces the entry (7 0 1) by (7 0 2) and sends the repair message of the first type (7 0 2) to all the nodes. Only node 5 is reached by this repair message, because the other nodes cannot be reached. Node 5 replaces the entry (7 0 1) by (7 0 2). The tables of nodes 5 and 6 contain only two repair messages of the first type, it is true, but nodes 5 and 6, like before, are end nodes of a closed sub-ring (relevant table entries (5 0 1) and (6 1 0)), so that the two nodes do not take any further steps, which is in accordance with rule 3. The tables of the further nodes 4, 3, 2, 1, 0 and 7 until then contain no repair messages whatsoever.

As a further cable is now repaired the cable of the inner ring between nodes 6 and 7. The node 7 detects that its receive cable on the inner ring is intact again, it replaces the table entry (6 1 0) by 6 2 0) and sends the repair message of the first type (6 2 0) to all the nodes, which message is now received by all the nodes and entered in the tables. As a result of the third repair message (6 2 0), the nodes 5 and 6 recognize that they are no longer end nodes of an isolated node group and therefore check their receive lines:

The node 5 detects that, in accordance with its table entry (4 2 0), the receive cable of the inner ring is further intact and, therefore, sends the repair message of the first type (4 2 0) to all the nodes in accordance with rule 3, which also receive this message.

The node 6 detects that in accordance with its table entry (7 0 2) the receive cable of the outer ring is intact, and, therefore, again sends the repair message of the first type (7 0 2) in accordance with rule 3 to all the nodes, which also receive this message.

It cannot be said with certainty for all the nodes in what order the repair messages (4 2 0) and (7 0 2) are received. Irrespective of this order, nodes 4 and 7, after receiving the first one of these messages, detect that they are no longer edge nodes of a closed sub-ring (relevant table entries (4 2 0) and (7 0 1) or (4 1 0) and (7 0 2)). Therefore, in accordance with rule 3, they check their receive cable:

The node 4 detects that, in accordance with the table entry (5 0 1) its receive cable of the outer ring is still defective and does not take any further steps.

The node 7 detects that in accordance with the table entry (6 2 0) its receive cable on the outer ring is intact, and again sends the repair message of the first type (6 2 0) to all the nodes in accordance with rule 3. This message is not required, it is true, but subject to the simple rules for the R2N reconfiguration.

With the reception of the repair message (4 2 0), the node 4 cancels the loop circuit (inner ring to outer ring), removes the entry (4 2 0) and sends the repair message of the second type (4 3 0) to all the nodes, which message is also received by all the nodes. With the reception of the repair message (7 0 2), node 7 cancels the loop circuit (outer ring to inner ring), removes the entry (7 0 2) and sends the repair message of the second type (7 0 3) to all the nodes, which message is also received by all the nodes. Thus, after the repair messages of the first type (6 2 0), (4 2 0) and (7 0 2), all the nodes have received the repair messages of the second type (6 3 0), (4 3 0) and (7 0 3) and the respective loop circuits were canceled, so that the tables of all the nodes contain only the entry (5 0 1) in accordance with the still existing cable rupture on the outer ring between nodes 4 and 5 and the loop switched in node 5 (outer ring to inner ring). When this last simplex cable rupture is repaired, the R2N reconfiguration is effected in accordance with a process described with reference to FIG. 7, so that the whole ring is again free of defects and all the status tables are empty.

What is claimed is:

1. A packet transmission network operating in accordance with a packet switching method, comprising a plurality of network nodes coupled via at least first ring and a second ring, wherein the first ring and the second ring operate in pairs that work in opposite directions, and wherein the nodes of the first ring are different than the nodes of the second ring, the nodes containing each in status tables entries about the location of a defect and switched loops from one ring to another ring in a network node, wherein a network node, after detecting a repaired defect, is provided for changing an entry in its status table and for transmitting a repair message of a first type about the location of the repaired defect to all the network nodes that can be reached.

2. A packet transmission network operating in accordance with a packet switching method, comprising a plurality of network nodes coupled via at least two rings, wherein each of the at least two rings operate in pairs that work in opposite directions, the nodes containing each in status tables entries about the location of a defect and switched loops from one ring to another ring in a network node, wherein a network node, after detecting a repaired defect, is provided for changing an entry in its status table and for transmitting a repair message of a first type about the location of the repaired defect to all the network nodes that can be reached, wherein a network node, after reception of a repair message of the first type, is provided for changing an entry in its status table and for checking whether a loop in the network node running from one ring to the other is to be canceled and in that the network node, after canceling a loop, is provided for sending a repair message of a second type about the cancellation of the loop to all the network nodes that can be reached.

3. A network as claimed in claim 2, wherein a network node is provided for canceling a loop from one ring to another in the network node when the network node contains in its status table:
 entries for one or more simplex cable ruptures on a ring, or entries for a loop message about a defect on one ring and a repair message of a first type relating to the other ring in case of a duplex cable rupture, or
 entries for two loop messages about defects on one ring and two repair messages of the first type relating to the other ring, or exactly four entries and a loop message about a defect on one ring and at least one repair message of the first type relating to the other ring, or
 exactly four entries and two repair messages of the first type relating to one ring and one loop message each about a defect relating to the other ring, or
 exactly three entries and one loop message about a defect on one ring and a repair message of a first type relating to the other ring.

4. A packet transmission network operating in accordance with a packet switching method, comprising a plurality of network nodes coupled via at least two rings, wherein each of the at least two rings operate in pairs that work in opposite directions, the nodes containing each in status tables entries about the location of a defect and switched loops from one ring to another ring in a network node,
 wherein a network node, after detecting a repaired defect, is provided for changing an entry in its status table and for transmitting a repair message of a first type about the location of the repaired defect to all the network nodes that can be reached,
 wherein a network node of an isolated node group or of an isolated node is provided for a renewed transmission of a repair message of the first type already sent out once before when, as a result of the repair of a defect and a message about it, there is no longer an isolated node group or an isolated node.

5. A packet transmission network operating in accordance with a packet switching method, comprising a plurality of network nodes coupled via at least two rings, wherein each of the at least two rings operate in pairs that work in opposite directions, the nodes containing each in status tables entries about the location of a defect and switched loops from one ring to another ring in a network node,
 wherein a network node, after detecting a repaired defect, is provided for changing an entry in its status table and for transmitting a repair message of a first type about the location of the repaired defect to all the network nodes that can be reached,
 wherein a network node is provided for erasing a repair message of a first or second type sent out by the network node itself.

6. A network node in a packet transmission network operating in accordance with the packet switching method, the network having further network nodes coupled via at least two first ring and a second ring, wherein the nodes of the first ring are different then the nodes of the second ring, the network node being a member of the first ring, and wherein least one node of the first ring operating in pair with at least one node of the second ring, and working in opposite directions, the nodes and network node contain in status tables entries about the location of a defect and switched loops running from one ring to another in a network node,
 wherein the network node, after the detection of a repaired defect, is provided for changing an entry in its status table and for transmitting a repair message of the first type about the location of the repaired defect to all the other network nodes that can be reached.

7. A ring node network comprising least a first ring and a second ring, each ring having ring nodes that are different than the ring nodes of an other ring, at least one ring node of the first ring operating as a pair with at least one ring node of the second ring, and operating in a defect protection state, wherein each of the plurality of ring nodes comprises a status table of defect locations, wherein at least one of the plurality of ring nodes is configured to transmit a repair message to all reachable ring nodes to update the reachable ring nodes status tables.

* * * * *